July 23, 1968  A. VISCHER, JR  3,393,628
PRESSURE COOKER
Filed Sept. 29, 1966
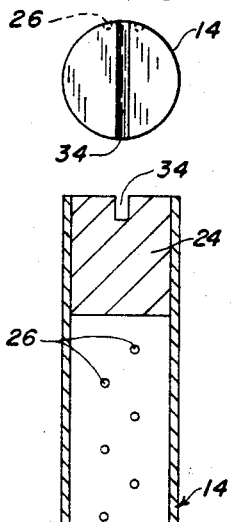
FIG. 3
FIG. 2
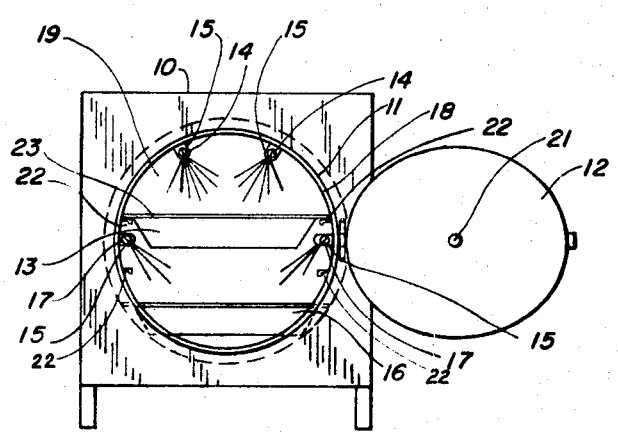
FIG. 1
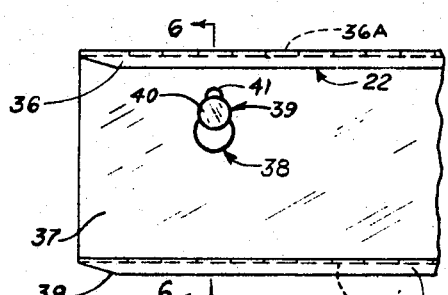
FIG. 5
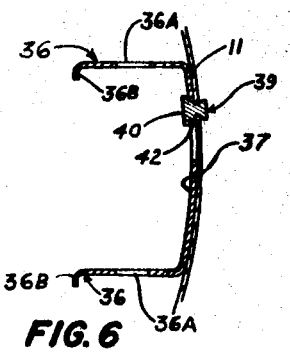
FIG. 6
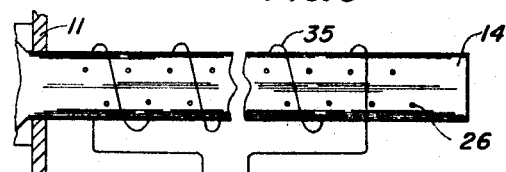
FIG. 4
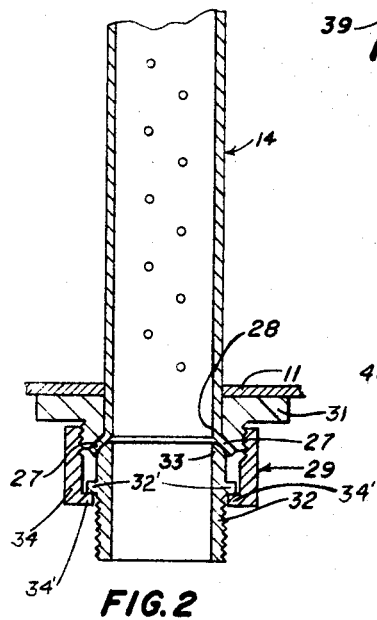
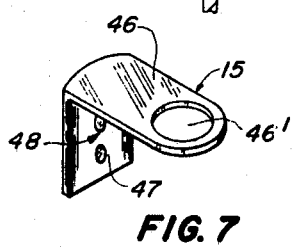
FIG. 7
INVENTOR:
Alfred Vischer Jr.
BY:
Fidler, Bradley & Patrick
ATTORNEYS

United States Patent Office 3,393,628
Patented July 23, 1968

3,393,628
PRESSURE COOKER
Alfred Vischer, Jr., Park Ridge, Ill., assignor of two-thirtieths each to William Vischer, Alfred Vischer III, and Peter Vischer, four-thirtieths each to Walter W. Zitzewitz, and Elmer K. Zitzewitz, one-thirtieth each to Gertrude J. Zitzewitz, and Barbara O. Zitzewitz, and two-thirtieths to Gertrude V. Bouton
Filed Sept. 29, 1966, Ser. No. 583,007
7 Claims. (Cl. 99—234)

ABSTRACT OF THE DISCLOSURE

A steam cooker includes a vessel adapted to detachably support a pair of open-topped pans, one above the other, within the cooking chamber of the vessel. A pair of spaced-apart steam conduits extends above each of the pans, and each conduit includes a series of apertures disposed along one side thereof for projecting steam under pressure directly down into the pans for the purpose of preparing food products supported by the pans. The terminal portion of each of the steam conduits is heated to a temperature exceeding the condensation temperature of the steam so that steam does not condense on the conduits.

---

This invention relates to pressure cookers, and it relates more particularly to pressure cookers of the type wherein jets of steam are directed under pressure onto a food product or the like during a cooking operation.

In certain presently available pressure cookers, jets of heated vapor are projected onto and into the surface of the food supported by the container whereby the vapor releases its heat to the food and is rapidly condensed thereon, thereby rasing the temperature of the food toward that of the vapor. Where the food product is in the frozen state at the start of the cooking period, the pressure within the vessel does not appreciably increase until the rapid rate of vapor condensation, brought on by the presence of the frozen food particles, ceases. Once the food has been thawed or defrosted, the rate of condensation decreases so that the vessel may be filled with vapor, thereby increasing the pressure toward that of the vapor supply.

Such pressure cookers are being successfully employed by restaurants and the like for rapidly preparing large quantities of food. It would be extremely desirable to have a pressure cooker of this general type that could be used to simultaneously prepare even greater quantities of food.

Accordingly, it is an object of the present invention to provide a new and improved pressure cooker of the general type heretofore described.

Another object of the present invention is to provide a pressure cooker of the type as hereinabove described which has a vastly increased capacity for preparing food whereby still larger quantities of food can be prepared while maintaining the same high degree of quality.

Yet another object of the present invention is to provide an improved pressure cooker of the type having conduits for projecting jets of heated vapor into a food mass for preparation thereof.

Still another object of the present invention is to provide a pressure cooker of the type having apparatus for projecting jets of heated vapor into a food mass for preparation thereof, which has an improved efficiency of heat transfer by the vapor to the food mass by preventing condensation of the vapor on the outer surface of the vapor-projecting apparatus.

Briefly, in accordance with the principles of the present invention, an improved steam cooker is provided having an open-topped food container detachably suspended from the inner wall of a pressure vessel and a pair of spaced-apart steam conduits extending above the container and each having apertures therein for projecting steam under pressure and free from entrained moisture directly down into the container. For the purpose of substantially increasing the capacity of the cooker, a second open-topped food container is provided which is detachably suspended or rests at the bottom portion of the same vessel and is directly supported by the inner wall thereof. Another pair of spaced-apart steam conduits each directly connected and contiguous to the inner wall of the vessel extends above the lower container and includes apertures for projecting steam under pressure and free from entrained moisture directly into the lower container. In addition to the increased capacity, such an arrangement also allows the user to prepare large, bulky food masses, such as a turkey, by removing the upper food container and inserting the large food mass into the lower container so that both the upper and the lower steam conduits can be utilized for the preparation of the same food mass. Furthermore, the efficiency of the heat transfer from the steam to the food mass is increased by heating the conduits to a temperature exceeding the condensation temperature of the steam. In one embodiment of the invention, this is accomplished by providing an electrically-energized heating coil for each of the steam conduits to supply heat to the terminal portion of the outer surface of the steam conduit.

Other objects and advantages will appear from the following description taken in connection with the appended sheet of drawings wherein:

FIGURE 1 is a front elevational view of a steam pressure cooker embodying the principles of the present invention;

FIGURE 2 is a longitudinal, cross-sectional, fragmentary view of one of the steam conduits extending through the wall of the pressure cooker of FIG. 1, illustrating a portion of a coupling device connected to the steam conduit;

FIGURE 3 is an end view of the steam conduit of FIG. 2;

FIGURE 4 is a fragmentary side elevational view, partially in schematic form, of a steam conduit with an electrically-energized heating coil mounted thereon;

FIGURE 5 is a front elevational view of a portion of a detachable angle bracket for supporting the food container of the pressure cooker of FIG. 1, which device is shown in the process of being attached to a shoulder rivet or shoulder screw connected to the inner wall of the vessel;

FIGURE 6 is a side elevational view, partially in cross-section, of the angle bracket and shoulder rivet of FIG. 5 taken substantially along the line 6—6 thereof; and FIGURE 7 is a perspective view of a mounting bracket for the steam conduits of FIGS. 1–3.

Referring now to FIG. 1, the steam pressure cooker 10 includes a cylindrical pressure vessel 11 having a pressure sealing door 12 at one end thereof and having upper and lower open-topped pans 13 and 16, respectively, removably positioned within the vessel 11. A pair of upper steam conduits 14 extend over the upper food pan 13 for projecting jets of clean, dry steam under pressure onto food placed in the pan 13. The lower pan 16 rests directly on the inner wall of the vessel 11. A pair of lower steam conduits 17 extending above the lower food pan 16 extends along the inner wall of the vessel 11 and each projects jets of clean, dry steam under pressure onto the food in the pan 16. The steam cooker 10 also includes a conventional valve-controlled pressure discharge line for relieving pressure from the vessel, not shown in the drawing, and also other conventional control devices to control the cooking process, not shown in the drawing. For more detailed explanation of the control equipment and other associated apparatus, see Churley Patents 3,071,063 and 3,071,473.

The door 12 is resilient and in the unstressed state is elliptically shaped and bowed about its horizontal axis outwardly from the plane of the paper as viewed in FIG. 1 such that its vertical diameter is less than the inner diameter of a flange 18 of the vessel 11 at an entrance 19 thereof. Hence, the door 12 may be pivoted about its hinge inwardly through the opening 19. The door 12 can then be flexed by a lever or screw arrangement 21 to a flat circular condition so that its outer edges bear against the inner surfaces of the flange 18. The construction is such that once pressure has been built up on the inside of the vessel 11, the door 12 will remain in sealing engagement with the flange 18 even after the lever arrangement 21 is released. This general type or door construction is described in detail in Vischer Patents 2,828,045 and 2,904,212.

The pans 13 and 16 can both be supported by means of a pair of angle brackets 22 which are detachably mounted on the inner wall of the vessel 17. Side flanges 23 on the pan 13 rest on the upper flange portions of the brackets 22. In order to remove the lower pan 16 from the vessel 11 without lifting it over the flange 18 of the vessel 11, which is the case when the lower pan 16 rests on the bottom surface of the vessel 11, the lower pan 16 may alternatively be supported by the lower flange portions of the brackets 22. Such an arrangement enables the pans to be readily and efficiently removed after the preparation of the food.

For the purpose of preparing a large bulky mass of food, such as a turkey, the larger food mass may be placed in the lower pan 16 while resting in its lower position on the bottom of the vessel 11, and the pan 13 may be removed from the vessel 11 to accommodate the larger food mass. In order to provide a larger quantity of steam for thawing and cooking the larger food mass, the upper steam conduits 14 are aligned in such a manner that they project jets of steam onto the food mass in the lower pan 16 in the absence of the upper pan 13 in addition to the jets of steam which are normally projected from the lower steam conduits 17 into the lower pan 16.

Referring now to FIG. 2, one of the steam conduits 14 and 17 is shown, it being understood that all four conduits are of the same construction. As there shown, the conduit 14 is a thin-walled elongated tube having a plug insert 24 press fitted into one end thereof. Two parallel rows of alternately positioned apertures 26 are located in the wall of the tube and provide orifices for forming the jets of steam. In order to couple the conduit 14 to a controlled source of pressurized steam, the end 28 of the tube is flared to provide an outwardly extending annular flange 27 for connection to a conventional union fitting, generally indicated at 29. The conduit 14 extends through an opening in the wall of the vessel 11 and is connected to the union fitting 29 having one portion 31 thereof silver soldered to the outer surface of the vessel wall.

The conventional union fitting 29 includes a hollow cylindrical bushing 32 having a rounded end portion 33 which fits into sealing engagement with the open end of the flange 27. The threaded sleeve 31 is silver soldered to the wall of the vessel 11 at the exterior thereof so that an outer union nut 34 having inner threaded walls at one end thereof can threadably engage the sleeve 31, whereby a lip 34' at the opposite end of the union nut 34 can bear against a ridge 32' of the cylinder 32 to exert an axial force on the member 32. The flange 27 is thereby sealably compressed between the bushing 31 and the rounded portion 33 of the cylinder 32.

In order to adjust the alignment of the conduits 14 and 17 for properly directing the jets of steam, the plug 24 has a diametrically disposed slot 34 located midway between the two rows of apertures. A screwdriver or the like may be inserted into the notch 34 to rotate the conduit 14 to the desired position before the member 31 is tightened.

As shown in FIG. 4, the conduits 14 and 17 each has in accordance with another feature of the present invention an electrically-energized heating coil 35 wrapped about the outer surface to heat the conduits to a temperature exceeding the condensation temperature of the steam. As a result, steam does not condense on the heated surface of the terminal portion of the conduits 14 and 17 and give up the latent heat of fusion to the conduit and therefore the efficiency of heat-transfer of the steam's heat to the food mass is significantly increased. The electrically-energized heating coil 35 is shown in schematic form in FIG. 4 and has its terminals 35' located outside of the vessel 11 for connection to a source of voltage. It should be understood that many different forms of heating devices may be employed in accordance with the present invention, such, for example, as printed wiring on the outer surface of the conduits.

Referring now to FIGS. 5 and 6, for the purpose of contacting and supporting the flange 23 of the pans 13 and 16, the brackets 22 each include a pair of horizontally-extending flange portions 36 having a series of perforations 36A located therein. In order to detachably mount the device 22 on the inner wall of the vessel 11, a vertical flange portion 37 integrally connected to the flange portion 36 has a generally arcuate surface conforming to the inner curved surface of the vessel 11, and includes a plurality of keyhole slots 38 for detachably engaging shoulder rivets 39 fixedly connected to the wall of the vessel 11. The device 22 is easily detached from the shoulder rivets 39 for cleaning purposes.

After passing the larger opening of the keyhole slot 38 over the head 40 of the shoulder rivet 39, the keyhole slot 38 has a smaller circular upper opening 41, which can be moved into conformity with the circular shoulder portion 42 of the shoulder rivet 39 behind the head 40. The arrangement as illustrated in FIG. 5 shows the bracket 22 in the process of being slid into position wherein the bracket rests on the rivets 39.

FIG. 6 shows one of the brackets 22 in its final resting position. The shoulder rivet 39 extends through an opening in the wall of the vessel 11 and is sealably secured thereto.

For the purpose of strengthening each of the flanges 36, each includes a downwardly depending lip 36B at the distal end thereof.

Referring now to FIG. 7, one of the L-shaped mounting brackets 15 for supporting the steam conduits 14 and 17 is shown to include an outwardly extending portion 46 having a circular aperture 46' at one end thereof for receiving the associated steam conduit 14, 17. A wall engaging portion 47 integrally connected to the portion 46 is fixedly and sealably secured to the inner wall of the vessel 11 by means of a suitable connecting device such as the rivets 48 or by welding. In order to conform to the contour of the inner wall of the vessel 11, the wall engaging portion 47 is arcuate in shape.

It was discovered that the operation of the pressure cooker in accordance with principles embodied in the present invention was particularly successful in an embodiment wherein the cylindrical vessel 11 is 15 inches in diameter at its cross-section, and the upper steam conduits 14 are spaced apart by 60° and symmetrically spaced about the vertical diameter of the vessel 11 to uniformly apply steam to the food. Each of the upper conduits 14 provides jets of steam in a 15° spray pattern from the two rows of apertures directed toward the center of the upper pan 13, and the lower steam conduits 17 are disposed along the horizontal diameter of the vessel 11. Jets of steam are likewise directed from the two rows of apertures in each of the lower conduits 17 in a 15° spray pattern toward the lower container 16. Each conduit has an outside diameter of 7/16 inch and each aperture is 1/16 inch diameter.

Although various minor modifications of the present invention will become readily apparent to those versed in the art, it should be understood that I wish to embody within the scope of the patent warranted hereon, all such embodiments as reasonably and properly come within the scope of my contribution to the art.

I claim:

1. A pressure cooker for preparing food products comprising:
   a pressure vessel;
   an upper food container disposed in said pressure vessel and detachably mounted on the inner wall thereof;
   upper vapor-directing means extending above said upper container and having apertures therein for projecting heated vapor under pressure directly down into said food products supported by said container;
   a lower food container disposed in said pressure vessel below said upper food container; and
   lower vapor-directing means extending above said lower food container directly connected and contiguous to the inner wall of said vessel and having apertures therein for projecting heated vapor under pressure directly into said food products supported by said lower container, said upper vapor-directing means being disposed to project vapor under pressure together with the vapor from said lower directing means down into said lower container in the absence of said upper container, wherein
   said upper vapor-directing means comprises a pair of upper elongated and spaced-apart steam conduits each connected to the inner wall of said vessel and a pair of electrically-energized heating coils for supplying heat to the upper steam conduits, each of said coils being thermally connected to the surface of a corresponding one of the upper conduits; and
   said lower vapor-directing means comprises a pair of lower elongated and spaced-apart steam conduits each connected to the inner wall of said vessel and a lower pair of electrically-energized heating coils for supplying heat to the lower steam conduits, each of said lower coils being thermally connected to a corresponding one of the lower conduits.

2. A pressure cooker according to claim 1, wherein said vessel is circular in cross-section, and said apertures in each of said conduits are aligned in two separate spaced-apart rows to provide a spray pattern of approximately 15°; and
   further including upper mounting means for supporting each of said upper conduits contiguous to the inner curved wall of said vessel and spaced-apart by approximately 60°, and lower mounting means for supporting each of said lower conduits contiguous to the inner curved wall of said vessel and symmetrically disposed about the vertical axis of said vessel along the horizontal axis thereof.

3. A pressure cooker according to claim 1, further including a first elongated mounting member fixedly secured to the inner surface of said vessel, said first member having upper and lower flange portions extending therefrom for detachably engaging one side of each of the first and second containers respectively, and a second elongated mounting member fixedly secured to the inner surface of said vessel spaced-apart from said first mounting member, said second member having upper and lower flange portions extending therefrom for detachably engaging the opposite side of each of the first and second containers respectively, whereby said upper and lower containers are supported between said first and second mounting members.

4. A pressure cooker for preparing food products having a pressurizable cooking chamber for retaining said food products and at least one multi-apertured spray tube extending into said chamber for conveying steam from an external steam generating source to said chamber in the form of high velocity jets directed against said food products, the improvement comprising:
   heating means independent of said steam and said steam generating source for heating said tube to a temperature at least equal to that of said steam, whereby the steam passing through said spray tube does not condense thereon.

5. The invention according to claim 4, wherein said means comprises an electric heating element carried by said tube.

6. The combination according to claim 4, wherein said pressurizable cooking chamber is adapted to receive and detachably support a first food container disposed within said chamber below said spray tube, said chamber being further adapted to receive and detachably support a second food container disposed within said chamber below the first food container; and said cooker further comprises a second multi-apertured spray tube directly connected and contiguous to the inner wall of said chamber for projecting steam under pressure directly down into said second food container; and
   second heating means independent of said steam for heating said second tube to a temperature at least equal to that of said steam so that the steam passing through said second spray tube does not condense thereon, the first spray tube being disposed to project steam under pressure together with the steam from said second spray tube down into the lower container in the absence of said first food container.

7. In a pressure cooker for preparing food products having a sealed pressure vessel, a food container disposed in said vessel, and a vapor-directing means for projecting heated vapor under pressure directly down into said food products supported by said container, said pressure cooker including:
   electrically-heated terminal means disposed within said vessel for heating the outer surface of the terminal portion of said vapor-directing means to a temperature exceeding the condensation temperature of the heated vapor, thereby preventing heated vapor from condensing on the heated surface of said vapor-directing means,
   a second food container disposed within said vessel below the first-mentioned food container and detachably mounted to the inner wall of said vessel;
   second vapor-directing means directly connected and contiguous to the inner wall of said vessel for projecting heated vapor under pressure directly down into said food products supported by said second food container; and
   second electrically-heated terminal means disposed within said vessel for heating the outer surface of the terminal portion of said second vapor-directing means to a temperature exceeding the condensation temperature of the heated vapor to thereby prevent heated vapor from condensing on the surface of said second directing means, the first-mentioned vapor-directing means being disposed to project vapor under pressure together with the vapor from said second directing means down into the lower container in the absence of said first-mentioned food container, wherein
   said first-mentioned and said second vapor-directing means each comprises a steam conduit having a plurality of apertures aligned in two separate spaced-apart rows; and
   the first-mentioned and said second terminal means each comprises an electrically-energized heating coil connected to the outer surface of the terminal portion of a corresponding one of the conduits.

(References on following page)

References Cited

UNITED STATES PATENTS

| | | | |
|---|---|---|---|
| 713,056 | 11/1902 | Busser | 21—96 |
| 1,328,657 | 1/1920 | Fish. | |
| 365,915 | 7/1887 | Fowble | 126—369 |
| 573,273 | 12/1896 | Kellogg | 21—98 |
| 817,495 | 4/1906 | Loew | 99—330 |
| 1,719,322 | 7/1929 | Dickson et al. | 126—369 |
| 2,574,950 | 11/1951 | Ben-Ami Ben-Dor | 126—369 |
| 2,899,534 | 8/1959 | Sjolund | 126—369 X |
| 3,030,486 | 4/1962 | Lashley | 99—234 |
| 3,130,662 | 4/1964 | Robinson | 99—421 X |
| 3,236,172 | 2/1966 | Haedike et al. | 126—369 |

FOREIGN PATENTS

| | | |
|---|---|---|
| 687,231 | 5/1964 | Canada. |
| 85,468 | 7/1895 | Germany. |

WALTER A. SCHEEL, *Primary Examiner.*

J. M. NEARY, *Assistant Examiner.*